(12) United States Patent
Omerbegovic et al.

(10) Patent No.: US 11,524,624 B2
(45) Date of Patent: Dec. 13, 2022

(54) ILLUMINATION SYSTEM OF A MOTOR VEHICLE FOR SHORTENING A ILLUMINATING DISTRIBUTION ON A CARRIAGEWAY, A HEADLIGHT SYSTEM AND A MOTOR VEHICLE COMPRISING THE SAME, AND ASSOCIATED METHOD

(71) Applicant: AUDI AG, Ingolstadt (DE)

(72) Inventors: Said Omerbegovic, Frankfurt am Main (DE); Johannes Reim, Eichstätt (DE)

(73) Assignee: Audi AG, Ingolstadt (DE)

( * ) Notice: Subject to any disclaimer, the term of this patent is extended or adjusted under 35 U.S.C. 154(b) by 172 days.

(21) Appl. No.: 16/771,842

(22) PCT Filed: Nov. 29, 2018

(86) PCT No.: PCT/EP2018/083027
§ 371 (c)(1),
(2) Date: Jun. 11, 2020

(87) PCT Pub. No.: WO2019/120930
PCT Pub. Date: Jun. 27, 2019

(65) Prior Publication Data
US 2021/0107396 A1     Apr. 15, 2021

(30) Foreign Application Priority Data
Dec. 20, 2017   (DE) .................. 10 2017 223 434.2

(51) Int. Cl.
*B60Q 1/14*       (2006.01)
*F21S 41/60*      (2018.01)
(Continued)

(52) U.S. Cl.
CPC .......... *B60Q 1/143* (2013.01); *B60Q 1/0023* (2013.01); *F21S 41/60* (2018.01); *G06V 20/588* (2022.01);
(Continued)

(58) Field of Classification Search
CPC .. B60Q 1/143; B60Q 1/0023; B60Q 2400/00; B60Q 2400/50; B60Q 2300/45
See application file for complete search history.

(56) References Cited

U.S. PATENT DOCUMENTS 10,134,280 B1 * 11/2018 You .................. G08G 1/162
10,220,769 B1 *  3/2019 Dellock .............. B60Q 1/50
(Continued)

FOREIGN PATENT DOCUMENTS

DE          10354104 A1    6/2005
DE       102004050597 A1    4/2006
(Continued)

OTHER PUBLICATIONS

International Preliminary Report on Patentability directed to related International Patent Application No. PCT/EP2018/083027, completed Nov. 27, 2019, with attached English-language translation; 19 pages.
(Continued)

*Primary Examiner* — William N Harris
(74) *Attorney, Agent, or Firm* — Sterne, Kessler, Goldstein & Fox P.L.L.C.

(57) ABSTRACT

The present disclosure relates to an illumination system for a motor vehicle for illuminating a carriageway section. The aim is to illuminate the carriageway section in such a way that irritations for other road users are avoided as far as possible. The illumination system includes an information system for providing or detecting a stopping point, an illumination device for projecting a calculated light distribution onto the carriageway section, and a control unit for calculating a light distribution, wherein the calculated light distribution is a one-piece area. The one-piece area begins from a predetermined starting section, which constitutes a proximal lighting section relative to the motor vehicle and does not extend beyond the stopping point. This leads to a (Continued)

shortening of a lane light of the motor vehicle, so that said lane light does not illuminate the lane beyond the stopping point. This is advantageous in particular for crossroads.

8 Claims, 3 Drawing Sheets

(51) Int. Cl.
*B60Q 1/00* (2006.01)
*G08G 1/16* (2006.01)
*G06V 20/56* (2022.01)

(52) U.S. Cl.
CPC ....... *G08G 1/166* (2013.01); *B60Q 2300/056* (2013.01); *B60Q 2300/33* (2013.01); *B60Q 2300/332* (2013.01); *B60Q 2300/336* (2013.01); *B60Q 2300/45* (2013.01); *B60Q 2400/50* (2013.01)

(56) References Cited

U.S. PATENT DOCUMENTS

| | | | |
|---|---|---|---|
| 2008/0062706 A1* | 3/2008 | Feldmeier | F21S 41/14 340/468 |
| 2008/0175012 A1 | 7/2008 | Shimaoka et al. | |
| 2011/0068910 A1* | 3/2011 | Iwai | F21S 41/663 340/435 |
| 2014/0062685 A1 | 3/2014 | Tamatsu et al. | |
| 2016/0114720 A1 | 4/2016 | Schlaug et al. | |
| 2017/0080850 A1 | 3/2017 | Drexler et al. | |
| 2017/0182934 A1 | 6/2017 | Arita et al. | |
| 2017/0255093 A1* | 9/2017 | Fujita | G03B 21/26 |
| 2018/0099604 A1* | 4/2018 | Mouri | G06V 20/58 |
| 2018/0118095 A1* | 5/2018 | Kunii | B60Q 1/08 |
| 2018/0261081 A1* | 9/2018 | Suzuki | B60Q 9/008 |
| 2018/0297470 A1* | 10/2018 | Kim | B60Q 1/085 |
| 2019/0202335 A1* | 7/2019 | Hori | B60Q 1/30 |
| 2019/0389366 A1 | 12/2019 | Sorokin | |

FOREIGN PATENT DOCUMENTS

| | | |
|---|---|---|
| DE | 102007054048 A1 | 5/2009 |
| DE | 102009051485 A1 | 6/2010 |
| DE | 102009009473 A1 | 8/2010 |
| DE | 102013217057 A1 | 3/2014 |
| DE | 102014207399 A1 | 10/2015 |
| DE | 102014221647 A1 | 4/2016 |
| DE | 102014016336 A1 | 5/2016 |
| DE | 102014226254 A1 | 6/2016 |
| DE | 102015012022 A1 | 3/2017 |
| DE | 112014006919 T5 | 5/2017 |
| DE | 102017202457 A1 | 8/2018 |
| EP | 1659029 A1 | 5/2006 |
| EP | 1862989 A2 | 12/2007 |
| EP | 2896937 A1 | 7/2015 |
| EP | 3018007 A2 | 5/2016 |
| EP | 3216653 A1 | 9/2017 |
| JP | 2008045870 A | 2/2008 |
| WO | WO 2016/015827 A1 | 2/2016 |
| WO | WO 2017/119557 A1 | 7/2017 |
| WO | WO 2018/162219 A1 | 9/2018 |

OTHER PUBLICATIONS

International Search Report and Written Opinion of the International Searching Authority directed to related International Patent Application No. PCT/EP2018/083027, dated Mar. 13, 2019, with attached English-language translation; 21 pages.

* cited by examiner

ILLUMINATION SYSTEM OF A MOTOR VEHICLE FOR SHORTENING A ILLUMINATING DISTRIBUTION ON A CARRIAGEWAY, A HEADLIGHT SYSTEM AND A MOTOR VEHICLE COMPRISING THE SAME, AND ASSOCIATED METHOD

TECHNICAL FIELD

The present disclosure relates to an illumination system for a motor vehicle for illuminating a carriageway section.

BACKGROUND

Current light-guiding functions, such as a construction site light or a lane light, which can be implemented using high-resolution headlights, illuminate an area on the road in front of the vehicle. To the knowledge of the applicant, the illuminated area in front of the vehicle has a constant length. If the light-guiding functions are always of a constant length, other road users who come into this illuminated area may be irritated.

The published patent application DE 10 2015 012 022 A1 describes a method for illuminating an area in the front of a vehicle. For this purpose, an illumination device having a control device and at least one headlight is used for the illumination. The headlight can illuminate several contiguous solid angle segments. The luminous brightness can be set separately for each of the solid angle segments by the control device. When an activation condition of the headlights is met, the control device controls the headlights in such a way that a predetermined initial pattern is first emitted as a light pattern. In a number of successive steps, the emitted light pattern is gradually converted from the initial pattern into an information pattern.

The published patent application DE 10 2007 054 048 A1 describes a method and a device for driving light control of a vehicle. For this purpose, image information of at least one object which contains a relative speed of the object relative to the vehicle is recorded. The at least one object is assigned to a specific object type on the basis of its relative speed. Depending on the object type, an angular range of one or more light cones corresponding to the at least one object is partially or completely left out.

DE 10 2017 202 457 A1 relates to a method for providing driver support for a driver when driving a motor vehicle on a traffic route. The driver guides the motor vehicle to branch off the traffic route. A traffic regulation is determined in relation to the branching. Depending on the determined traffic regulation by means of a headlight of the motor vehicle in a region of the branching, a stopping point line visible to the driver as visual driver support is extended onto the traffic route.

The published patent application DE 10 2009 009 473 A1 describes a method in which other road users are detected in the area surrounding the vehicle. It is analyzed whether another road user represents a collision risk for the vehicle. If another road user presents a collision risk for the vehicle, a light signal is extended onto the road from the vehicle, which alerts the other road user to the risk of a collision.

DETAILED DESCRIPTION

The object of the present disclosure is to reduce possible irritation of other road users, which can contribute to increasing traffic safety.

This object is achieved in accordance with the independent patent claims. Advantageous refinements of the disclosure will become apparent from the dependent claims.

The present disclosure provides an illumination system for a motor vehicle for illuminating a carriageway section. The illumination system has an information system for providing or detecting a stopping point. Furthermore, the illumination system includes an illumination device for projecting a calculated light distribution onto the carriageway section and a control unit for calculating the light distribution. The calculated light distribution is a one-piece area. This one-piece area is based on a predetermined starting section, which constitutes a proximal lighting section relative to the motor vehicle. At the same time, the one-piece area does not extend beyond the stopping point. The information system can include, for example, various sensors which can detect or scan an environment of the motor vehicle. Such sensors can be, for example, a camera, a laser scanner, a radar sensor, a Lidar sensor or an ultrasonic sensor. All of these sensors can be part of the information system. With the help of these sensors, the information system can provide current data for the control unit. The control unit can thus record and analyze a current traffic situation which affects the stopping point. The predetermined starting section preferably begins in an area in front of the motor vehicle in the normal direction of travel on the road, which can be up to 3 meters away from the motor vehicle. Thus, the predefined starting section of the calculated light distribution on the road does not begin, in particular, directly on the motor vehicle, but is at a predefined distance from the motor vehicle. This distance of the starting section from the motor vehicle can depend on the speed of the motor vehicle and a course of the road.

In addition, the information system can have a navigation system. The navigation system can contain digital maps and/or predictive route data. In particular, a stopping point can be specified by the navigation system. For example, the navigation system can provide a crossroad as a stopping point. The navigation system can also specify other types of stopping points. For example, zebra crossings or level crossings can also be stored as stopping points in the navigation system, which transmits these stopping points to the control unit. In addition, the sensors contained in the information system and the navigation system can interact to determine or verify a stopping point. For example, a crossroad with a traffic light cannot be clearly defined as a stopping point. The carriageway section in question is alternately designed as a priority road or a stopping point. With a green traffic light, for example, no stopping point could be provided; with a red traffic light, the stopping point would be defined by a stopping point line in the area of the traffic light on the road.

If, for example, the motor vehicle approaches a crossroad with the traffic light, the existence of the traffic light can already be known to the control unit from the navigation system. In addition, the sensors of the information system can currently determine the status of the traffic light on site. For example, a camera system can determine whether the traffic light is green or red. The information from the navigation system and the camera system can thus be meaningfully linked to one another. It makes sense to set a stopping point if there is a crossroad and a traffic light in red. In this situation, the light distribution would be shortened so that it does not extend beyond the stopping point.

In some embodiments, the information system has a camera for recording environmental data and/or a navigation system for providing predictive route data with regard to the stopping point. Predictive route data include, in particular, carriageway sections that the motor vehicle will reach during a journey in the near future. This near future represents a period of about 30 seconds in particular. However, the time period can also be longer or shorter. As a rule, predictive route data does not mean the current environmental data of the motor vehicle. Current environmental data of the motor vehicle can be captured and evaluated by a camera having a corresponding image capture and image evaluation. Different types of cameras can be used. For example, the camera can be designed as a monocular camera, stereo camera or fisheye lens camera. The camera can detect dynamic objects in the area surrounding the motor vehicle, for example by means of an optical flow or a movement-based structure recognition as image processing methods. With the aid of a convolutional neural network (CNN), an object type of the detected object can be determined on the basis of several images that the camera can record. This information can be taken into account by the control unit for determining a stopping point or for calculating the light distribution.

For example, the control unit can use a plurality of images recorded by the camera to detect a moving object. This moving object could, for example, be a wild animal approaching the road of the motor vehicle. In this situation, it may be important to assess whether or not the wild animal will be entering the road of the motor vehicle. If the wild animal moves away from the road of the motor vehicle, preferably no stopping point would be determined. However, if the wild animal were to approach the road of the motor vehicle continuously or abruptly, the control unit could determine a stopping point which is in front of the wild animal in the direction of travel of the motor vehicle. In this case, the light distribution would be adjusted so that it does not extend beyond the stopping point. Ideally, this means that the wild animal is not unnecessarily blinded. This can be particularly beneficial because wildlife often tends to stop suddenly when blinded. If the wild animal is not blinded in this situation, the chance that it leaves the road again increases. In this situation, the illumination system can additionally provide that an acoustic warning tone is emitted in the direction of travel. This is intended to encourage the wild animal to leave the road. This example can also be applied to other dynamic objects, for example children playing. The driver of the motor vehicle receives the intuitive information that the light is not shortened beyond the stopping point and does not extend beyond the stopping point. At the same time, another road user can be warned additionally by means of the acoustic warning tone. This can increase the chance that no accident will occur in critical traffic situations.

In some embodiments, the information system has a radar sensor, a Lidar sensor and/or an ultrasonic sensor. Depending on the application, a different sensor can be provided. If a longer range is desired, a radar sensor is often used. However, if a shorter distance of, for example, a few meters is sufficient and at the same time a higher resolution is to be provided than with radar sensors, Lidar sensors are often used. An ultrasonic sensor can usually measure an area of around three meters. Because of its low cost, an ultrasonic sensor is often used.

In some embodiments, the one-piece area is a rectangle. The rectangle in particular has a predetermined width. This width preferably corresponds to either the width of a road on which the motor vehicle is located or a width of the motor vehicle itself. A length of the rectangle extends in particular in a direction of travel of the motor vehicle. This variant of the disclosure is preferably provided for a straight course of the road. However, it is also possible for the calculated light distribution to have several one-piece areas as rectangles. This means that instead of a uniformly acting carpet of light, two light strips designed as a rectangle can represent the calculated light distribution. Rectangular surfaces are symmetrical and particularly easy to perceive by a driver of the motor vehicle.

In some embodiments, the control unit is designed such that the light distribution is only calculated in the manner mentioned if an additional condition is met. In some situations, the stopping point may not be an actual stopping point, but a potential stopping point. In this case it makes sense to verify the potential stopping point. Since the potential stopping point is not completely defined by its nature, further information is required, in this case the additional condition, in order to confirm the potential stopping point as the actual stopping point. This can prevent a stopping point from being determined that does not exist. In such a case, the light distribution is not incorrectly limited to the virtual stopping point. From the point of view of the driver driving the motor vehicle, it appears as if the light distribution is shortened. A standard setting of the illumination system, which provides for such a shortening of the light distribution only at an actual stopping point, could irritate the driver of the motor vehicle. For example, he may feel compelled to initiate some kind of emergency braking, which could be dangerous for subsequent vehicles. In this disclosure, this state is avoided since a potential stopping point is not simply adopted, but is verified on the basis of the additional condition. The additional condition can be, for example, a surface condition of the road, local weather conditions, objects approaching the road or recognized human gestures determined by the information system. For example, the information system or the control unit can use camera images to recognize a policeman who, on the basis of his posture, prompts him to stop.

In some embodiments, the information system is designed to recognize a predetermined right-of-way situation for the additional condition. In many cases, the additional condition is determined by a right-of-way situation on site. For example, if the motor vehicle approaches a crossroad with a stop sign, this means that the driver must stop in any case. The stop sign could be recognized, for example, by appropriate image processing algorithms. In a logic provided, traffic signs, such as the stop sign, can be stored as an additional condition. In this situation, the information system would recognize the stop sign and set a stopping point based on it. Previously, the stopping point would not have been clearly determined due to the crossroad. The existence of the crossroad would be determined by the information system as a potential stopping point. In this case, an actual stopping point would only be determined from the potential stopping point if the additional condition was taken into account. This enables the information system to verify a potential stopping point at an actual stopping point. If, in this situation, the motor vehicle approached the aforementioned crossroad on the priority road, the additional condition would not be met. In this case, the light distribution would not be adjusted. In this situation, if the driver of the motor vehicle were on the priority road, this would also not be necessary and sensible. Using the logic provided, the control unit or the information system can recognize various pre-defined right-of-way situations.

In some embodiments, a traffic sign, a barrier and/or a crossroad can be detected as the stopping point with the information system. The traffic sign can be, for example, a stopping sign, a "give way" sign or a dynamically controllable sign that identifies the respective road as a street that is not authorized to drive up. The barrier extends primarily perpendicular to the road of the motor vehicle at a predetermined height of the road in order to bring it to a stop. Barriers are used, for example, at level crossings, toll stations, border crossings or entrances to land. The information system can recognize a barrier shaped as a cylinder as well as a barrier whose shape is more like a cuboid. The crossroad can be in the form of a classic crossroad in which two carriageway sections intersect at an angle of approximately 90 degrees. The crossroad can also be designed as a roundabout. Even carriageway sections that do not intersect at right angles can be recognized as a crossroad by the information system. In particular, the information system can recognize a main road with right-of-way when the motor vehicle approaches the priority road from a dirt road as a main road.

It is provided that the control unit is designed to select the stopping point for calculating the light distribution that is closest to the starting section when there are several stopping points provided by the information system. Under certain circumstances, the information system can determine several potential stopping points. This can be the case, for example, when the motor vehicle approaches a crossroad and at the same time there is a dynamic object that approaches the road. In this case, the presumed place of entry of the dynamic object on the road would represent a first potential stopping point; the crossroad would represent a second potential stopping point depending on the right-of-way situation. These two potential stopping points can also depend on a respective additional condition. In this case, if the information system determines two actual stopping points that have been verified, the control unit selects the stopping point that is closest to the starting section. If, for example, a wild animal crosses the road before arriving at a crossroad, the light distribution would be based on the stopping point determined by the wild animal. This ensures that other objects or road users are not blinded unnecessarily. This variant of the disclosure enables even complex situations in traffic to be taken into account. The light distribution can be adjusted depending on several different traffic situations.

In some embodiments, the information system is designed to carry out an observation of other road users in order to recognize the right-of-way situation. In certain situations, it may be necessary to observe other road users in order to clarify a specific right-of-way situation. For example, if a pedestrian approaches a zebra crossing, the information system can determine a trajectory of the pedestrian and thus decide whether the pedestrian will cross the zebra crossing. To do this, it may be necessary to observe the pedestrian for a certain period of time in order to obtain enough data to calculate his corresponding trajectory. In order to be able to better assess future behavior of the pedestrian, a probabilistic modeling of the images taken by the pedestrian can be carried out in particular. This would preferably be implemented by the control unit and so several trajectories can be determined with an associated probability. That trajectory having the highest probability with regard to an arrival of the pedestrian on the road can preferably be taken into account for the provision of the stopping point.

The pedestrian trajectory describes in particular different positions of the pedestrian at different times. If the trajectory of the pedestrian, for example, shows that the pedestrian is moving away from the zebra crossing, there is no corresponding additional condition for the presence of a stopping point in this case. Appropriate image processing could be used to examine the face of a pedestrian so that a line of sight of the pedestrian can be determined. A pedestrian's line of sight can be an important indicator of a pedestrian's direction of movement. The pedestrian's line of sight can therefore be taken into account to recognize the right-of-way situation. A corresponding method could be applied analogously to animals.

In some embodiments, the information system has an interface for receiving environmental data from other motor vehicles. In this case, potential stopping points that have been determined by other motor vehicles can be transmitted to one's own motor vehicle. These potential stopping points provided by other motor vehicles can be viewed as a type of predictive route data. If, for example, another motor vehicle driving ahead detects a group of people on the road, this other motor vehicle can transmit this situation to its own motor vehicle as information. The environmental data received in this way from other motor vehicles can be taken into account for determining a stopping point and for calculating the light distribution.

The present disclosure further provides a headlight system for a motor vehicle having an illumination system for extending the light distribution onto the carriageway section. The illumination system described in the previous variants is preferably used in motor vehicles. Since the illumination system is to be used to extend a light distribution onto the road, it may make sense to integrate the illumination system into an existing headlight system of a motor vehicle. However, separate headlights can also be provided for the representation or the extension of the light distribution on the carriageway section. The present disclosure therefore also includes a motor vehicle having a headlight system. The headlight system is preferably arranged in the front area of the motor vehicle. The front area of a motor vehicle is predefined on the basis of a predefined main direction in which the motor vehicle is moving. The headlights on the motor vehicle are preferably high-resolution headlights, which in particular can each have several hundred LED elements.

The present disclosure also provides a method of illuminating a carriageway section for a motor vehicle by performing the following method steps. First, a stopping point is provided or recorded. This can be done using appropriate sensors and a navigation system. The stopping point is taken into account when calculating a light distribution. The calculated light distribution is a one-piece area. It starts from a predetermined starting section and spreads out towards the stopping point. The predetermined starting section constitutes a proximal lighting section relative to the motor vehicle. The light distribution is calculated so that it does not extend beyond the stopping point based on the specified starting section. Finally, the calculated light distribution is extended onto the carriageway section. For this purpose, preferably a headlight or a headlight system with several headlights is used.

The disclosure will now be explained in more detail with reference to the accompanying drawings.

The disclosure also includes the combinations of the described embodiments.

The disclosure also includes refinements of the method according to the disclosure, which include features such as those that were previously described in connection with the refinements of the motor vehicle according to the disclosure. For this reason, the corresponding developments of the method according to the disclosure are not described again herein.

The exemplary embodiments explained below are preferred embodiments of the disclosure. In the exemplary embodiments, the components of the embodiments that are described each constitute individual features of the disclosure to be considered independently of each other, which individually also further develop the disclosure independently of each other and are thus also to be considered part of the disclosure both individually and in a combination that is different from the combination described. In addition, the embodiments described can also be supplemented by further features of the disclosure, which have already been described.

In the figures, functionally identical elements are each denoted with the same reference signs.

Figure 1:
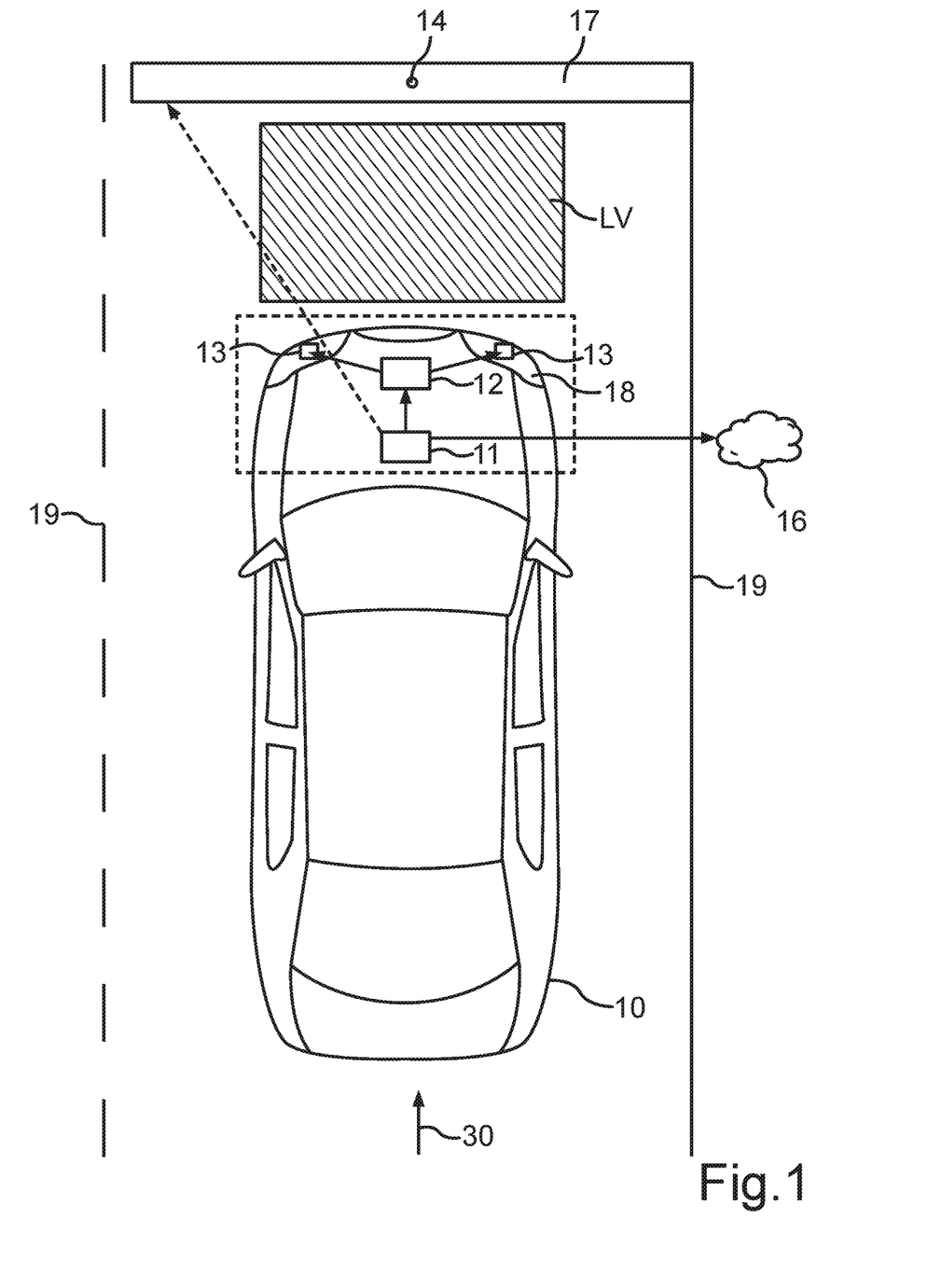
FIG. 1 illustrates a schematic plan view of a motor vehicle having an illumination system, light distribution and stopping point, according to some embodiments of the present disclosure.

FIG. 1 shows an example of a motor vehicle 10 which is located on a road 30 with a correspondingly predetermined direction of travel. This road 30 is defined by appropriate road markings 19. Motor vehicle 10 includes an illumination system 18. The illumination system 18 has several components. These include an information system 11, a control unit 12 and an illumination device 13. The navigation system 11 can have different sensors in order to detect the surroundings of the motor vehicle 10. For example, FIG. 1 shows that the information system 11 recognizes a stopping point marking 17. The information system 11 can transmit this information to the control unit 12. The transmission can take place, for example, via a bus system, in particular via a CAN bus system.

The information system 11 can also access an external server 16. The external server 16 can provide further information relating to a stopping point 14. This information can in particular contain predictive route data. The information system 11 can transmit the information determined or provided by the external server 16 to the control unit 12 so that the control unit 12 calculates a corresponding light distribution LV. The calculated light distribution LV is emitted by the illumination devices 13 of the motor vehicle 10. It is preferably emitted in such a way that a one-piece area is illuminated in front of the motor vehicle. The one-piece illuminated area of the light distribution LV is limited in the direction of the road 30. It extends up to the stopping point 14. However, as shown in this example, the light distribution LV can end before the stopping point 14. The light distribution can end, for example, about half a meter before the stopping point 14.

Figure 2:
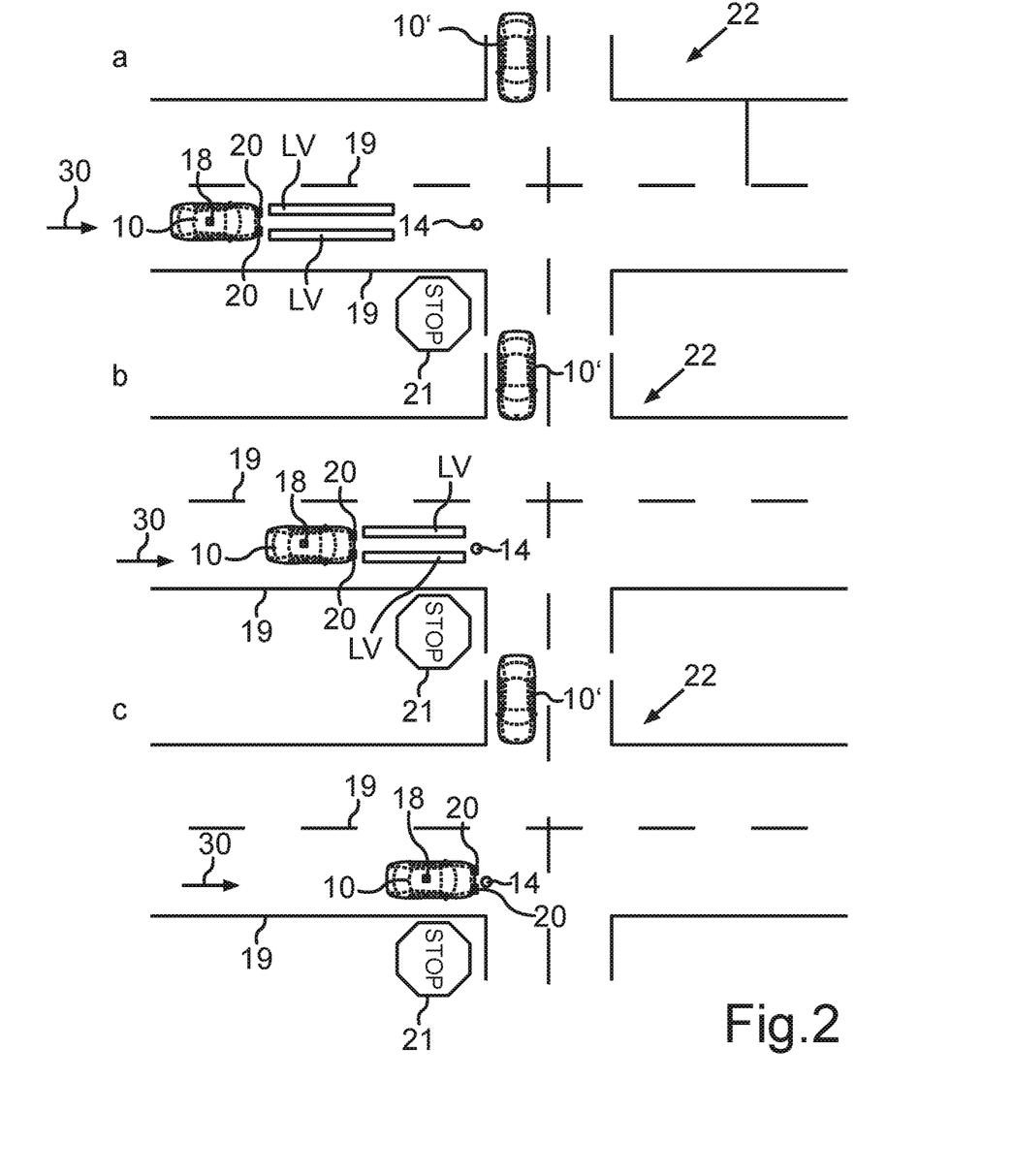
FIG. 2 illustrates a schematic representation of the light distribution when the motor vehicle approaches a crossroad, according to some embodiments of the present disclosure.

FIG. 2 shows an example of how the light distribution LV adapts when a crossroad 22 approaches. The motor vehicle 10 is located on the road 30 with the associated road direction. In this case, the road 30 ends at the crossroad with a traffic sign 21. In this case, the traffic sign 21 is designed as a stop sign. The crossroad 22 could already be specified as a potential stopping point 14 on the basis of predictive route data. The stop sign can be recognized with the aid of a camera system as part of the information system 11. The control unit 12 or the information system 11 can use the information, which in this example include the crossroad 22 and the stop sign, to determine the stopping point 14. In this example, the stopping point 14 is approximately positioned at the place at which the motor vehicle 10 has to stop. In example a of FIG. 2, the motor vehicle 10 is still far enough from the crossroad 22 that an adjustment of the light distribution LV is not necessary. The light distribution LV is shown between the corresponding road markings 19 using one or more headlights 20. The light distribution is preferably displayed on the road 30.

In example b of FIG. 2, the motor vehicle 10 has already approached the crossroad 22 to such an extent that the light distribution LV has already been adapted. The light distribution emitted by the headlights 20 is already significantly shorter in example b than in example a. The control unit 12 controls the headlights 20 or the associated illumination devices 13 in such a way that the light distribution LV on the road 30 does not extend beyond the stopping point 14. The light distribution LV is controlled as if there were a wall at the stopping point 14. This can prevent the light distribution LV from shining into the area of the crossroad 22. This can prevent other motor vehicles, such as motor vehicle 10', from being unnecessarily blinded by the light.

In example c of FIG. 2, the motor vehicle 10 has reached the stopping point 14 and has to stop due to the stop sign. Since in this case in particular another motor vehicle 10' is driving on the priority road, stopping is not only a requirement, but a necessity in this case. If, in example c of FIG. 2, the light distribution protrudes into the crossroad 22, the other motor vehicle 10' would be illuminated by the light distribution LV. This could lead to the driver of the motor vehicle 10' being blinded, which in the worst case can cause the driver to react unpredictably. The driver of the motor vehicle 10' could feel blinded by the incidence of light from the light distribution LV in such a way that it either brakes abruptly or changes course. For this reason, in example c of FIG. 2 there is no longer any light distribution LV since the motor vehicle 10 has already reached the stopping point 14. This means that the light distribution LV has a length of zero in the example c of FIG. 2 or the light distribution LV has such a small length that it does not protrude into the crossroad 22. If the traffic sign in FIG. 2 were not designed as a stop sign, but rather as a right-of-way sign, the determination of the stopping point 14 would not be given from the outset. In this case, the control unit 12 could additionally define or determine the stopping point as a function of a further additional condition.

Figure 3:
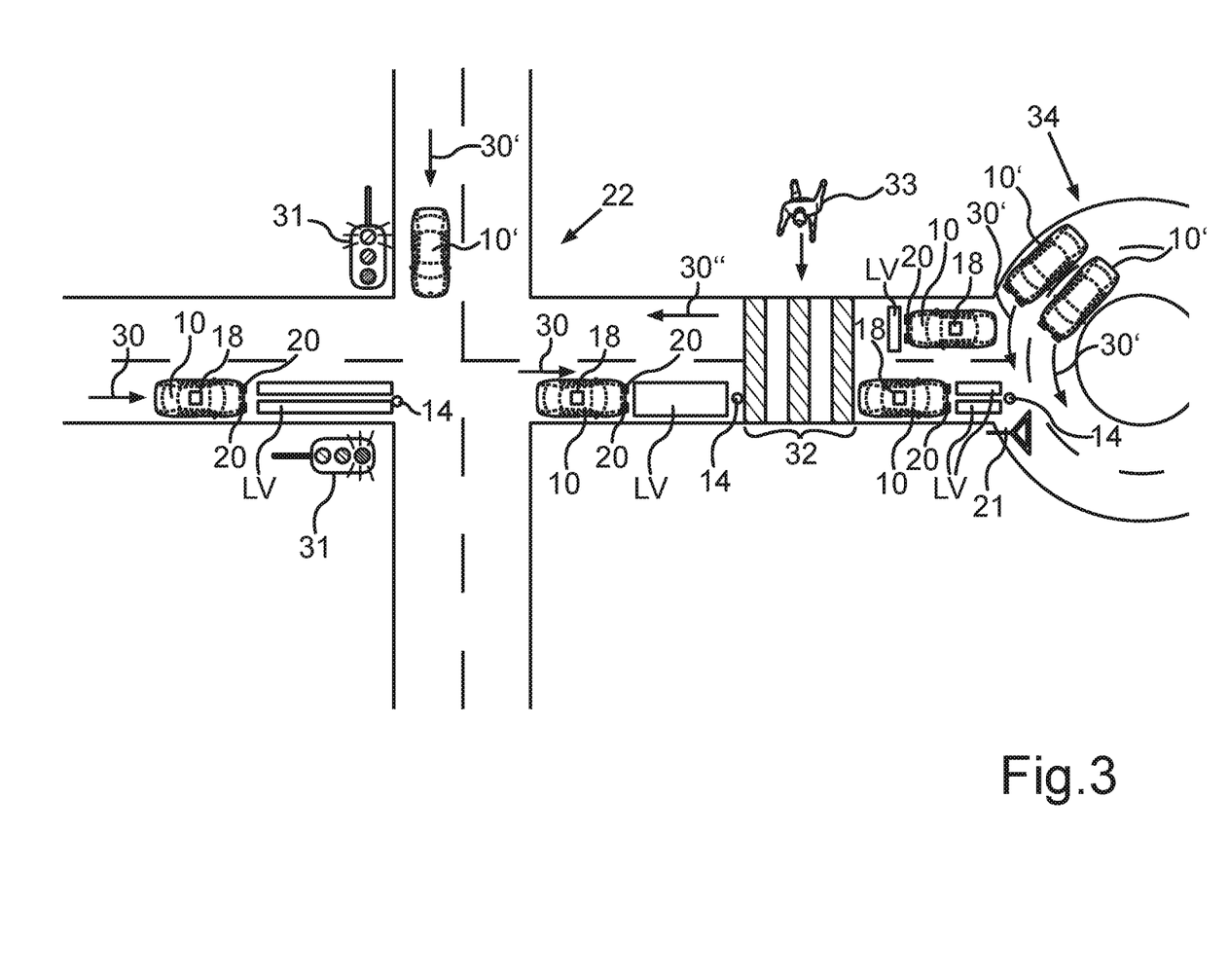
FIG. 3 illustrates a schematic representation of several light distributions in different traffic situations, according to some embodiments of the present disclosure.

FIG. 3 shows three further traffic situations with the associated light distributions LV by way of example. In the left area of FIG. 3, the motor vehicle approaches the crossroad 22, which in this case is controlled by a traffic light 31. That is, the road 30 of the motor vehicle 10 is alternately a priority road and a non-priority road. The crossroad 22 could be known to the information system 11 or the control unit 12, for example, on the basis of predictive route data. However, since the traffic light 31 represents a dynamic right-of-way regulation, the specific right-of-way situation at this crossroad 22 depends on the status of the traffic light. In this case, the illumination system 18 with the information system 11 contained therein determines the status of the traffic light 31. For example, a camera can be used to determine whether the traffic light 31 is green, red or yellow. Image processing correspondingly connected to the camera could, for example, determine the current status of the traffic light 31 on the basis of the position of the currently active lamp of the traffic light 31. In the example in FIG. 3, the traffic light 31 lights up so that the motor vehicle 10 has to stop. That is, the traffic light relating to motor vehicle 10 is red. The presence of the crossroad 22 and the status of the traffic light 31 cause the control unit 12 to determine the stopping point 14. In this case, the control unit 12 controls the headlights 20 of the motor vehicle 10 in such a way that the light distribution LV in the form of two light strips does not extend beyond the stopping point 14 into the crossroad 22.

In the center area of FIG. 3, the motor vehicle 10 is approaching a zebra crossing 32. In this situation too, the stopping point 14 is not given solely by the zebra crossing 32. The stopping point 14 depends here in particular on the circumstance of whether a pedestrian 33 wants to cross the zebra crossing 32. In this case, a camera system as part of the illumination system 18 can recognize the pedestrian 33 approaching the zebra crossing 32. It can be concluded from this that the pedestrian 33 wants to cross the zebra crossing 32 and the road 30. On the basis of this information, the control unit 12 or the information system 11 can verify the stopping point 14. The zebra crossing 32 would define a potential stopping point, which is verified based on the approaching pedestrian 33 to the actual stopping point 14. The control unit 12 controls the headlights 20 of the motor vehicle 10 such that the light distribution LV ends before the stopping point 14 or does not extend beyond it. A blinding of the pedestrian 33 can thus be prevented. A further motor vehicle 10 with the illumination system 18 is shown in the area of the zebra crossing 32. In this case, the motor vehicle 10 is in the lane 30". Since the motor vehicle 10 has already reached the zebra crossing 32 in this case, the length of the light distribution LV has been restricted to such an extent that it acts rather like a line instead of a rectangle. In this case, the light distribution LV acts more like the stopping point marking 17.

In the right-hand area of FIG. 3, the motor vehicle 10 approaches a roundabout 34 in the lane 30. This roundabout 34 has two lanes inside. In each of these lanes there are other motor vehicles 10' which follow the direction 30'. In this case, the traffic sign 21 is placed in front of the roundabout 34. The traffic sign 21 is designed here as a right-of-way sign. The control unit 12 can, for example, be designed in such a way that the stopping point 14 is in principle also established when there is a right-of-way sign. The control unit 12 can also be designed in such a way that the stopping point 14 is only determined after the specific right-of-way situation has been checked. Since a right-of-way sign does not necessarily require the motor vehicle 10 to be stopped, the control unit 12 can act differently in this case.

In this example, however, the stopping point 14 would be set in both cases, since the motor vehicle 10 must in any case stop within the roundabout 34 because of the other motor vehicles 10'. The stopping point 14 leads to the control unit limiting the light distribution LV according to its extent. In this situation, the closer the motor vehicle 10 approaches the roundabout 34, the shorter the shown light distributions LV become. In this case, the light distributions LV are designed as two separate rectangular strips. They are adjusted so that they do not extend beyond the stopping point 14 into the roundabout 34. The blinding of the driver of the other motor vehicle 10' can thus be avoided, as in the example of the crossroad 22.

In addition, the information system 11 can have further vehicle sensors, which provide information about the distance to motor vehicles in front. The control unit 12 can take into account the distance to a motor vehicle driving in front for the calculation of the light distribution. In particular, the length of the light distribution LV can be limited to the distance from the motor vehicle driving in front. The navigation system as part of the information system 11 can also provide a distance to the crossroad 22 in front, the zebra crossing 32 in front or the roundabout 34 in front on the basis of GPS data. This information is preferably transmitted to the control unit 12 via a bus system, for example a CAN system. The control unit 12 can have an internal logic, by means of which a right-of-way situation or a condition for the stopping point 14 can be determined on the basis of several different parameters. For example, the information "green traffic light" and "crossroad" preferably do not lead to a stopping point 14, but the presence of the zebra crossing 32 in combination with the approaching pedestrian 33 preferably results in the stopping point 14 shown in FIG. 3. The respective light distributions can be controlled in particular by assigning a certain extension (length) to each light distribution. The one-piece area, which represents the light distribution on the road, can thus be adapted so that it does not extend beyond the stopping point 14.

The cited explanations and examples relating to this disclosure show that a lane light of the motor vehicle 10 can be adjusted in length depending on various traffic situations. The length of the lane light, in particular, is limited in such a way that the blinding of other road users is reduced, ideally excluded. The information system 11 can detect and analyze several different traffic situations. The conditions for the detection of the stopping point 14 can be set flexibly using the logic provided. This makes it possible to adapt the shortening of the lane light of the motor vehicle 10 to the respective traffic regulations of a country. The examples presented in this application are primarily aimed at avoiding irritation of other road users, which can contribute to increasing traffic safety.

The invention claimed is:

1. An illumination system for a motor vehicle to illuminate a carriageway, comprising:
    an information system, comprising:
        a camera configured to detect environmental data; and
        a navigation system configured to provide predictive route data,
        wherein the information system is configured to:
            provide or detect a stopping point on the carriageway in a direction of travel for the motor vehicle to stop;
            observe other road users to recognize a right-of-way situation for an additional condition, wherein the additional condition comprises an arrival of a pedestrian on the carriageway;
            determine a plurality of pedestrian trajectories for the additional condition; and
            verify the stopping point in the right-of-way situation;
    an illumination device configured to:
        project a light distribution onto the carriageway with a length extending in the direction of travel, wherein the light distribution is a one-piece area that begins from a starting section next to the motor vehicle and the length of the light distribution is shortened when the stopping point is provided or detected to avoid irritation of the other road users; and
    a control unit configured to:
        calculate the light distribution for the right-of-way situation in the additional condition;
        examine, by image processing, a face of the pedestrian;
        determine, based on the face, a line of sight of the pedestrian as an indicator for a direction of movement of the pedestrian for the right-of-way situation;

determine, from the plurality of pedestrian trajectories, an associated probability of the arrival of the pedestrian on the carriageway;
consider a pedestrian trajectory with a highest probability for the stopping point; and
select the stopping point closest to the starting section when a plurality of stopping points are provided by the information system.

2. The illumination system according to claim 1, wherein the information system comprises a radar sensor, a Lidar sensor and/or an ultrasonic sensor.

3. The illumination system according to claim 1, wherein the one-piece area is a rectangle.

4. The illumination system according to claim 1, wherein the information system is further configured to detect a traffic sign, a barrier and/or a crossroad as the stopping point.

5. The illumination system according to claim 1, wherein the information system further comprises an interface for receiving environmental data from other motor vehicles.

6. A headlight system for a motor vehicle, comprising:
an illumination system for projecting a light distribution onto a carriageway, wherein the illumination system comprises:
an information system, comprising:
a camera configured to detect environmental data; and
a navigation system configured to provide predictive route data,
wherein the information system is configured to:
provide or detect a stopping point onto the carriageway in a direction of travel for the motor vehicle to stop;
observe other road users to recognize a right-of-way situation for an additional condition, wherein the additional condition comprises an arrival of a pedestrian on the carriageway;
determine a plurality of pedestrian trajectories for the additional condition; and
verify the stopping point in the right-of-way situation;
an illumination device configured to:
project the light distribution onto the carriageway with a length extending in the direction of travel, wherein the light distribution is a one-piece area that begins from a starting section next to the motor vehicle and the length of the light distribution is shortened when the stopping point is provided or detected to avoid irritation of the other road users; and
a control unit configured to:
calculate the light distribution for the right-of-way situation in the additional condition;
examine, by image processing, a face of the pedestrian;
determine, based on the face, a line of sight of the pedestrian as an indicator for a direction of movement of the pedestrian for the right-of-way situation;
determine, from the plurality of pedestrian trajectories, an associated probability of the arrival of the pedestrian on the carriageway;
consider a pedestrian trajectory with a highest probability for the stopping point; and
select the stopping point closest to the starting section when a plurality of stopping points are provided by the information system.

7. A motor vehicle, comprising:
a headlight system, comprising an illumination system for projecting a light distribution onto a carriageway, wherein the illumination system comprises:
an information system, comprising:
a camera configured to detect environmental data; and
a navigation system configured to provide predictive route data,
wherein the information system is configured to:
provide or detect a stopping point onto the carriageway in a direction of travel for the motor vehicle to stop;
observe other road users to recognize a right-of-way situation for an additional condition, wherein the additional condition comprises an arrival of a pedestrian on the carriageway;
determine a plurality of pedestrian trajectories for the additional condition; and
verify the stopping point in the right-of-way situation;
an illumination device configured to:
project the light distribution onto the carriageway with a length extending in the direction of travel, wherein the light distribution is a one-piece area that begins from a starting section next to the motor vehicle and the length of the light distribution is shortened when the stopping point is provided or detected to avoid irritation of the other road users; and
a control unit configured to:
calculate the light distribution for the right-of-way situation in the additional condition;
examine, by image processing, a face of the pedestrian;
determine, based on the face, a line of sight of the pedestrian as an indicator for a direction of movement of the pedestrian for the right-of-way situation;
determine, from the plurality of pedestrian trajectories, an associated probability of the arrival of the pedestrian on the carriageway;
consider a pedestrian trajectory with a highest probability for the stopping point; and
select the stopping point closest to the starting section when a plurality of stopping points are provided by the information system.

8. A method for illuminating a carriageway for a motor vehicle, comprising:
providing or detecting a stopping point on the carriageway in a direction of travel for the motor vehicle to stop, comprising:
observing other road users to recognize a right-of-way situation, comprising:
examining a face of a pedestrian for an additional condition, the additional condition comprises an arrival of the pedestrian on the carriageway;
determining, by image processing and based on the face, a line of sight of the pedestrian as an indicator of a direction of movement of the pedestrian, wherein the line of sight of the pedestrian is used to recognize the right-of-way situation;
determining, from a plurality of trajectories of the pedestrian, an associated probability of the arrival of the pedestrian on the carriageway; and
considering a trajectory with a highest probability for the stopping point;

verifying the stopping point when the right-of-way situation is recognized; and selecting the stopping point closest to the starting section when a plurality of stopping points is provided;

calculating a light distribution, the calculated light distribution being a one-piece area that begins from a starting section next to the motor vehicle, and a length of the light distribution being shortened when the stopping point is provided or detected to avoid irritation of the other road users; and projecting the calculated light distribution onto the carriageway with the shortened length extending in the direction of travel.

\* \* \* \* \*